F. H. RICHARDS.
Converting Motion.
No. 149,336. Patented April 7, 1874.
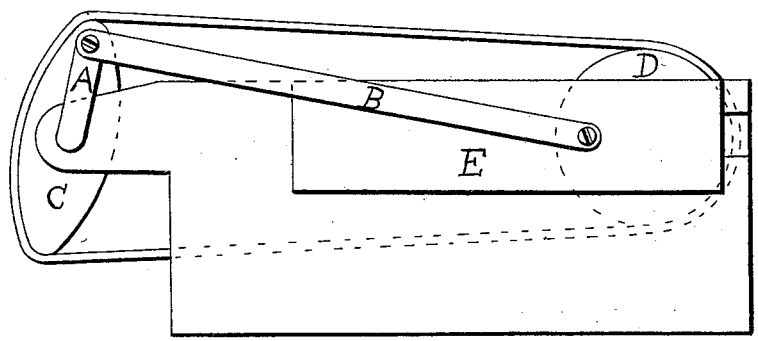
Witnesses
Justus N Traux
Hubert P. Richards.
Inventor.
Francis H. Richards.

UNITED STATES PATENT OFFICE.

FRANCIS H. RICHARDS, OF NEW BRITAIN, CONNECTICUT.

IMPROVEMENT IN CONVERTING MOTIONS.

Specification forming part of Letters Patent No. 149,336, dated April 7, 1874; application filed December 31, 1873.

*To all whom it may concern:*

Be it known that I, FRANCIS H. RICHARDS, of New Britain, in the county of Hartford and State of Connecticut, have invented a new and useful Mechanical Movement, of which the following is a specification, and the accompanying drawing a clear illustration:

My invention has for its object to furnish an improved device for imparting reciprocating motion to slides or other mechanism that shall cause them to move with a nearly uniform velocity through the greater and central part of their stroke, giving motion to and bringing them to rest gradually and without shock, after the manner of a crank.

This result I accomplish by means of a crank, A, connecting-rod B, or its equivalent, and an oblong pulley, C, upon the crank-shaft. This oblong pulley C is placed in such a position upon the crank-shaft, with reference to the crank A and the driving-pulley D, that, when the crank is passing the dead-center, it is moving with its greatest velocity, and when the crank is at half-stroke it is moving with its least velocity. This peculiar motion equalizes the motion of the slide E, so it is almost identical with the motion imparted by a heart-shaped cam with a roller working upon its face.

The connecting-rod B may be dispensed with, and the crank-pin made to work the slide by a groove at right angles with its motion; and the respective places of the pulleys C D, when of equal circumference, may be changed, and connected by a chain instead of a belt, without affecting the subject-matter of my invention.

This invention is especially valuable for driving rifling, slotting, and planing machines, and others of that class.

I claim as my invention—

The oblong pulley C, revolving about a point near its center, and belted to a round pulley, D, in combination with the crank A, connected to a slide, in the manner described.

FRANCIS H. RICHARDS.

Witnesses:
JUSTUS A. TRAUT,
HUBERT P. RICHARDS.